Jan. 6, 1970    B. WEISSMAN    3,487,545
DENTAL RETAINING SPLINT, SECURING MEANS
THEREFOR, AND COMBINATION
Filed Sept. 18, 1968
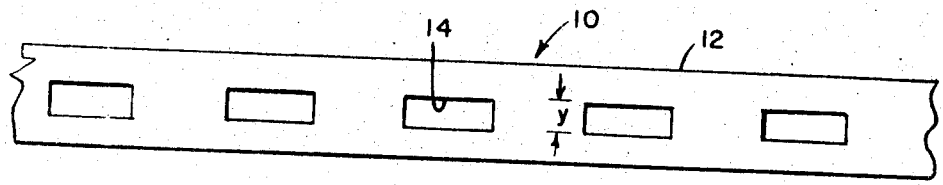
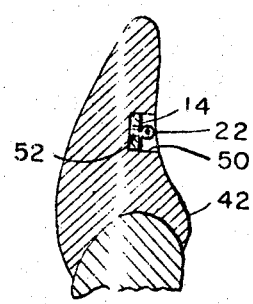
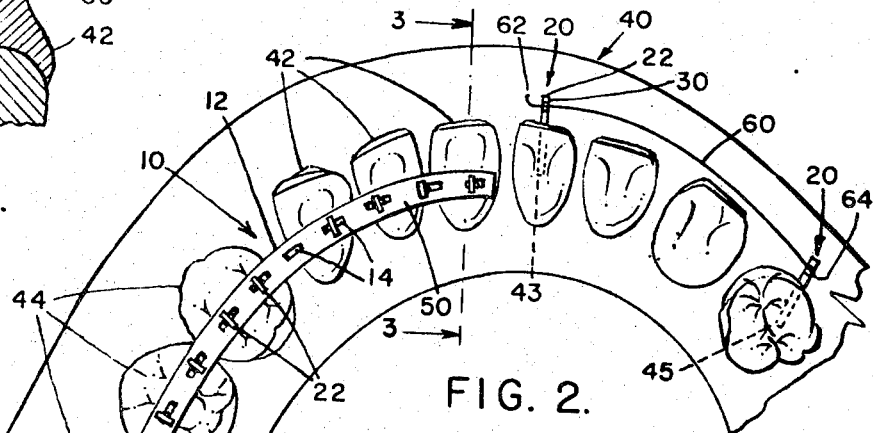
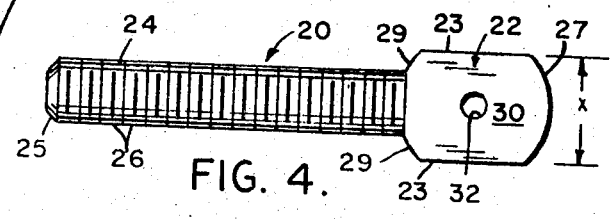
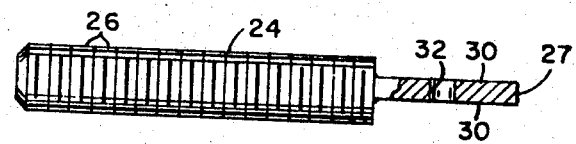
INVENTOR.
BERNARD WEISSMAN

United States Patent Office 3,487,545
Patented Jan. 6, 1970

3,487,545
DENTAL RETAINING SPLINT, SECURING MEANS THEREFOR, AND COMBINATION
Bernard Weissman, 304 Ashland Place,
Brooklyn, N.Y. 11217
Filed Sept. 18, 1968, Ser. No. 760,652
Int. Cl. A61c 7/00
U.S. Cl. 32—14                                5 Claims

ABSTRACT OF THE DISCLOSURE

A dental retaining splint comprising a band of dental metal provided with a plurality of spaced, centrally located elongated apertures along its longitudinal dimension; securing means therefor comprising a securing member having a head portion and a shank portion, said shank portion being threaded along its vertical dimension so as to be self-threading when securing the dental retaining splint to the teeth to be reinforced thereby, said head being a shaped, generally flat, vertically oriented body having an aperture centrally defined therein; and combination of dental retaining splint and securing means therefor.

BACKGROUND OF THE INVENTION

Field of the invention

The invention relates to a splint for the reinforcement and retention of teeth in the mouth and to means for securing the splint to the teeth.

Description of the prior art

The practice of reinforcing natural teeth by means of a splint structure disposed along the lingual surfaces of anterior teeth is now recognized in the particle of dentistry. The methods for the formation of such splints and their application are however accompanied by serious limitations. Among the limitations in the current practice of the fabrication and application of splint structures is the requirement that securing pins for the splint structure formed integrally therewith must be disposed in horizontal parallelism. This requirement arises from the fact that the splint must be inserted from the lingual side and the fact that the securing pins which are intended to be inserted through perforations formed in the tooth body are formed integrally with the splint structure. As a consequence of this, it has been found to be impractical, if not impossible, to apply such splints to other than the anterior teeth. The requirement of horizontal parallelism in the securing pin portion of the splint has also made it necessary to utilize involved and complicated procedures in the preparation of the teeth and particularly in connection with the formation of the perforations which are adapted to receive the securing pins. As a consequence of this, special equipment has been developed and must be utilized in order to assure the requisite parallelism and the procedure from the point of view of the dentist has been involved and time-consuming. The procedures involved are also the source of considerable discomfort to the patient.

A procedure for overcoming the aforementioned prior art problems has been disclosed in my U.S. Patent 3,348,311. However that procedure involves forming apertures in the teeth, forming an impression of the involved dental area, then forming a cast model from the impression including the apertures, inserting a threaded pin through the apertures in the cast model, putting a threaded nut on the pin, then forming a wax-up of the desired splint and casting out a metal splint body by the lost wax process whereby the nuts are encased in the metal splint body, and finally disposing the splint body against the facial surfaces of the involved teeth and securing the splint body in place by means of a screw-threaded body into the nut encased in the splint. While the latter is efficacious it can be seen that is not as uncomplex as it might be. Moreover, it is not readily applied to the occlusal surfaces of the posterior teeth.

SUMMARY OF THE INVENTION

It is, therefore, among one of the principal objectives of the invention to provide a splint structure which may be readily secured not only to the lingual surfaces of the teeth but also to the occlusal surfaces of the posterior teeth, as well, and by a relatively simple combination of structures.

In accordance with the present invention, a dental retaining splint is provided which comprises a band of a suitable dental metal having a plurality of spaced, centrally located elongated apertures defined therein along its longitudinal dimension; securing means therefor comprising a securing member having a head portion and a shank portion, said shank portion being threaded along its vertical dimension so as to be adapted to be self-threading when securing the dental retaining splint to the teeth to be reinforced thereby, said head being a shaped, generally flat, vertically oriented body, with respect to the shank portion, there being an aperture centrally defined in said head for the fixation of orthodontic wires thereto, when so required, and when employed for that purpose. The invention is also directed to the combination of the dental retaining splint, and the securing means therefor.

BRIEF DESCRIPTION OF THE DRAWING

The invention will be hereinafter more fully described with reference to the accompanying drawing, in which:

FIGURE 1 is a top plan view of the invention splint.

FIGURE 2 is a fragmented lingual-occlusal view of the mandibular dentition, showing the invention splint secured to a portion thereof and also showing an orthodontic wire attached to the facial surface surface along a portion thereof by means of the invention securing members.

FIGURE 3 is a sectional view taken along line 3—3 of FIG. 2, in the direction of the arrows.

FIGURE 4 is a front face view of the invention-securing member; and

FIGURE 5 is a partially sectional side view of the device shown in FIG. 4.

DESCRIPTION OF THE PREFERRED EMBODIMENTS

Referring now to the figures of the drawing, and specifically to FIG. 1, there is shown a dental retaining splint 10, hereinafter referred to for convenience, as "splint." Since it is to be installed in the month, it is formed of a suitable dental metal such as a gold alloy, or the like. Splint 10 comprises an elongated band 12, having a longitudinal dimension and a transverse dimension. Band 12 is provided with a plurality of spaced, generally centrally located elongated apertures 14 defined therein. Apertures 14 are preferably rectangular in shape for a reason to be shown, and are spaced longitudinally along band 12, with their longitudinal dimension being in the same direction as the longitudinal dimension of band 12.

Referring now to FIGS. 4 ard 5, a securing member 20, for use when securing the splint 10 to the teeth to be reinforced thereby, as will be seen, is provided according to another embodiment of the invention. Securing member 20 comprises a head portion 22 and a shank portion 24 with a terminal end 25 thereof in slightly tapered condition. Shank portion 24 is adapted to be self-threading by means of threads 26 provided along the vertical dimension of said shank portion. Head 22 is a shaped, generally flat, vertically oriented body, with respect to the shank portion 24, and is integrally formed therewith. Head 22 has a pair of opposing flat faces 30, a pair of opposing, parallel side walls 23, a curved top-most portion 27, and tapered shoulders 29 at the point of integral juncture with shank 24. An aperture 32 is provided between flat faces 30 in a generally central relation therewith, which aperture 32 serves to further adapt securing member 20 for use as an anchoring member for orthodontic wires, as will be also subsequently described hereinbelow. Member 20, likewise to be installed in the mouth, as splint 10, is also formed of a suitable dental metal.

Referring now to FIGS. 2 and 3 wherein the operation of the inventive devices is described, there is shown a portion of the mandibular dentition 40, although the invention is equally applicable to the maxillary dentition, and wherein it is desired to install the splint 10 to overlie lingual areas of three anterior teeth 42, as well as the occlusal surfaces of three next-adjoining posterior teeth 44. What is done is to first drill a connecting concave channel 50, by conventional means, into the lingual surfaces of the anterior teeth 42 and the occlusal surfaces of posterior teeth 44, which channel 50 will serve to accommodate splint 10 within its concavity, as especially shown at FIG. 3. Note that by virtue of its band-like structure, band 12 may be manipulated into channel 50 although it runs from the lingual surfaces to the occlusal surfaces.

With band 12 comfortably accommodated in channel 50, suitable holes 52 are thereafter drilled, through the overlying elongated apertures 14, into the associated tooth surfaces, the holes 52 being of a size to receive the threaded shank 24 of securing member 20. Thereafter, into each hole 52, via its associated overlying elongated aperture 14, is threaded a securing member 20 by means of threaded shank 24, which as mentioned earlier, self-threads into hole 52. It should be mentioned at this point that the width X of flat head 22 is at all times larger than the transverse dimension Y of aperture 14. This so that, when securing member 20 is finally threaded home into hole 52, by simply twisting it, the head 22 thereof may be manipulated so that it is at right angles to the longitudinal dimension of the elongated aperture 14, and by virtue of width X being larger than transverse dimension Y, head 22 will hold band 12 underlying it tightly in place. That is why it is preferable that aperture 14 be rectangular in shape, although it is equally clear that any other shape could be employed, e.g. oval, elliptical, so long as its transverse dimension were smaller than the width X of head 22.

Securing member 20 is also adapted in another embodiment of the invention to serve as an anchoring point for an orthodontic wire attached to the facial surface of teeth as shown in FIG. 2, to the right of the section line. In order to string the wire 60 between a series of teeth, a securing member 20 is threaded into two opposing facial anchor locations, as at 43 and 45, and then each end 62 and 64 of the orthodontic wire 60 is looped into each aperture 32 located on head 22 and the wire is tightened around the head.

It should be remembered that the invention is applicable to the mouth and teeth and that the size of the inventive devices will be miniscule in relation to the size of the drawings illustrating them.

Thus what has been provided by the invention is a simple and extremely effective way of splinting teeth whether on lingual or occlusal surfaces. There has been provided, additionally, a simple and extremely effective way of attaching orthodontic wires to the teeth.

What is claimed is:

1. In combination, a dental retaining splint comprising an elongated band having plural apertures therealong of a prescribed shape, and cooperating securing members for attaching said splint to teeth, each said securing member comprising a body having threads thereon adapted to threadably engage a tooth as a result of rotative movement thereof, and a head on said body of a cooperating shape with said prescribed shape of each said aperture such that said head is adapted to be aligned with said aperture, projected therethrough and subsequently rotated out of alignment therewith, whereby said subsequently rotated position of said head retains said splint in an engaged condition on said tooth.

2. In combination, a dental retaining splint and securing means therefor, for securing said retaining splint to the teeth to be retained thereby, a channel being provided in said teeth to receive said retaining splint, said dental retaining splint comprising a band of dental metal having a plurality of spaced centrally located elongated apertures defined therein, said apertures being longitudinally spaced along said band, said securing means comprising a securing member formed of dental metal having a head portion and a shank portion, said shank portion being threaded along its vertical dimension so as to be adapted to be self-threading into said teeth when securing said retaining splint to said teeth through said elongated apertures when said retaining splint is received in said channel and said elongated apertures overlie the teeth to be retained, said head portion being a shaped generally flat body, said body being vertically oriented with respect to said shank portion, said elongated apertures having their longitudinal dimension in the same direction as that of said band, the flat head portion of said securing member having a width larger than the widest transverse dimension of said elongated apertures, so that when said securing member is threaded into the tooth underlying its associated aperture, the flat head of said securing member may be transversely installed over said elongated aperture thereby securing said band tightly in place into the channel therefor.

3. A device according to claim 2, wherein at least one tooth is retained by means of its lingual surface and at least one tooth is retained by means of its occlusal surface.

4. A retaining splint according to claim 2, wherein said elongated apertures are substantially rectangular in shape.

5. A securing member according to claim 2, employed as an anchor member for an orthodontic wire.

References Cited

UNITED STATES PATENTS

| 2,151,723 | 3/1939  | Trinkle      | 32—15 |
| 3,082,525 | 3/1963  | Christensen  | 32—2  |
| 3,348,311 | 10/1967 | Weissman     | 32—6  |
| 3,395,455 | 8/1968  | Overby et al.| 32—6  |

ROBERT PESHOCK, Primary Examiner